United States Patent Office 3,489,388
Patented Jan. 13, 1970

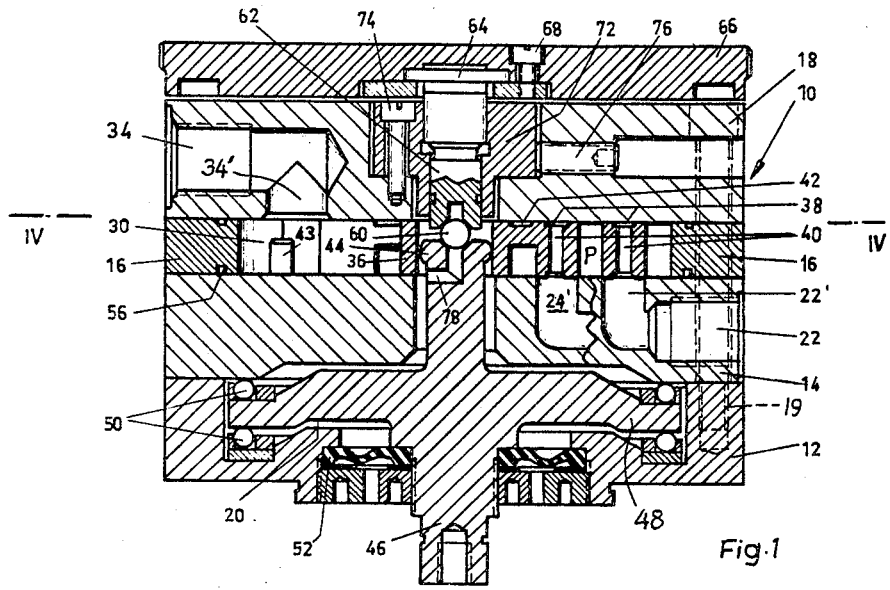
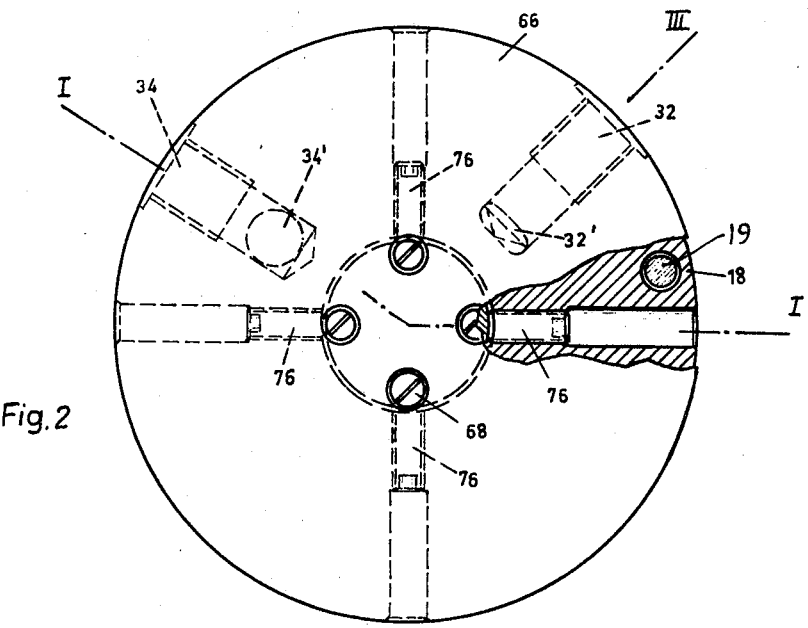
Fig.1
Fig.2

3,489,388
HYDRAULIC CONTROL VALVE FOR COPYING-MILLING MACHINES
Konrad Bschorer, Wolfratshausen-Waldram, Germany, assignor to Friedrich Deckel Prazisions Mechanik und Maschinenbau, Munich, Germany, a German firm
Filed June 1, 1967, Ser. No. 642,745
Claims priority, application Germany, June 8, 1966, D 50,278
Int. Cl. B23q *35/18;* F17d *3/00*
U.S. Cl. 251—3                         13 Claims

ABSTRACT OF THE DISCLOSURE

There is disclosed a hydraulic control valve for copying-milling machines, in which a control slide, operatively connected to a feeler or stylus, is in the form of a disk having edges which control the flow of hydraulic fluid to two hydraulic motors or cylinders which move the cutting tool in two directions at right angles to each other. The edges of the slide which control the hydraulic flow are arranged in pairs along side of each other, on two radii (with respect to the approximately circular housing of the valve) which form a right angle with each other. This enables the connections for the pipe lines for the hydraulic motors to be very close to each other on the valve housing, which results in short conduits. The control edges have what may be called negative overlap with respect to the ports with which they cooperate, so that there is a continuous flow of hydraulic fluid even when the control disk is in the position of zero displacement, and the flow of oil prevents a crust from building up on the control edges. The disk-like control slide extends over only a part of the housing surface which contains the ports with which the control edges cooperate.

BACKGROUND OF THE INVENTION

Hydraulic control valves for controlling the operation of copying-milling machines are known in the art. One example of such a valve is disclosed in United States Patent 3,148,594, granted Sept. 15, 1964 (Class 91–413). Many others are known. The present valve constitutes an improvement over the previous valves, furnishing a construction which is relatively easy to build, which is arranged so that the piping connections or conduits to the source of hydraulic fluid and to the motors (e.g., hydraulic cylinders) controlled by the valve can be relatively short, which provides for equalizing certain of the operating pressures, and which enables a constant flow of hydraulic fluid at all times, preventing or reducing encrustation of the ports and control surfaces.

BRIEF DESCRIPTION OF THE DRAWINGS

FIG. 1 is a vertical section through a control valve in accordance with a preferred embodiment of the invention, the section being taken approximately on the line I—I of FIG. 4;

FIG. 2 is a top plan view of the valve, with parts broken away to show certain details of the interior construction;

DESCRIPTION OF THE PREFERRED EMBODIMENT

Figure 3:
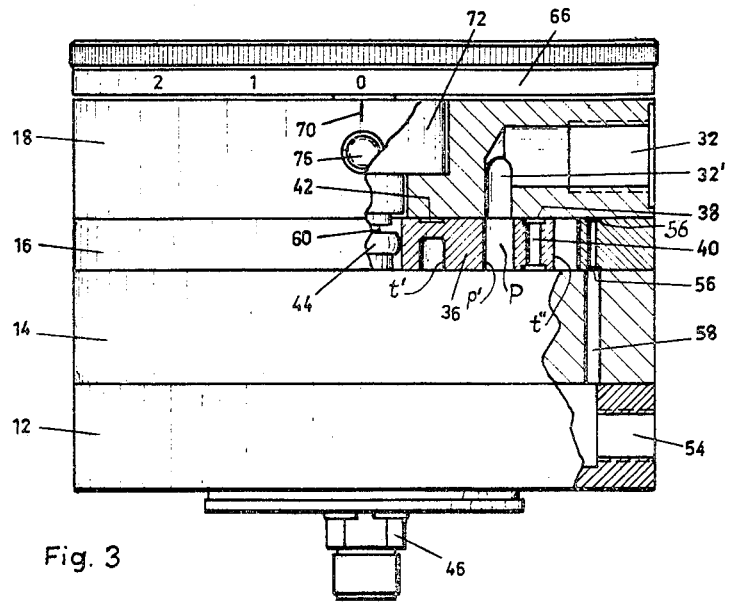
FIG. 3 is a side elevational view of the valve, with parts broken away and parts shown in vertical section approximately on the line III of FIG. 4.

Referring now to the drawings, the preferred embodiment of the valve comprises a housing indicated in general at 10, consisting mainly of four annular plates. The bottom plate is indicated at 12; next above it is a plate 14; above that a plate 16, and on top of that, a housing plate 18, all of the plates being held tightly stacked one on the other in liquid tight relation to each other, by means of vertical bolts or screws 19 extending downwardly through appropriate openings in the plates 18, 16, and 14, and threaded into tapped openings in the bottom plate 12, these screws being arranged near the marginal edges of the plates, and being spaced circumferentially from each other.

The outside diameters of the plates are substantially equal, so that the outside lateral surface of the valve housing is of substantially smooth cylindrical form. The inside diameter of the plate 16 is considerably larger than the inside diameters of the other plates, the plate 16 serving mainly as a spacer to space the plates 14 and 18 from each other and to leave a large central space 30 between them. The bottom plate 12 is recessed on its upper face as at 20, to provide space for receiving an operating member as further described below, which operating member is mounted between the plates 12 and 14 for limited horizontal movement in any direction, and which is attached to the tracing feeler or stylus.

Figure 4:
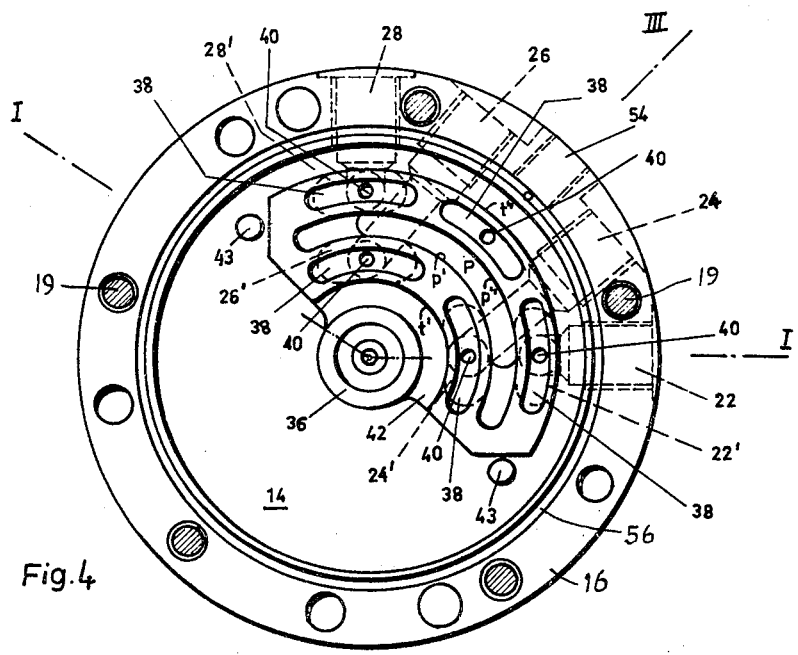
FIG. 4 is a horizontal section taken approximately on the line IV—IV of FIG. 1.

The plate 14 is provided with four pipe connection openings 22, 24, 26, and 28 (FIGS. 1 and 4) arranged in pairs as shown in FIG. 4, the connections 22 and 24 being close to each other, and spaced somewhat from the connections 26 and 28 which are similarly close to each other. In the intended use of the control valve, conduits lead from the connections 22 and 24 to opposite ends of a suitable hydraulic motor such as a hydraulic cylinder, which controls movements of the cutting tool of the milling machine in one horizontal direction, and conduits lead from the connections 26 and 28 to opposite ends of a second hydraulic motor such as a hydraulic cylinder, which controls movements of the cutting tool in another horizontal direction at right angles to the first direction.

The connections 22, 24, 26, and 28 lead to and communicate with ports 22', 24', 26', and 28', respectively, these ports opening at the upper face of the plate 14, and being arcuate and elongated in a circumferential direction, with rounded ends, as seen in broken lines in FIG. 4. They may be described as kidney shaped. The openings lie alongside of each other in pairs, the two openings or ports of each pair being on the same radial line with respect to the valve housing. In other words, the ports 22' and 24' are on the same radial line and are radially spaced from each other, and the other two ports 26' and 28' are on the same radial line and are radially spaced from each other. The two radial lines on which the two pairs of ports are located, are at 90 degrees to each other.

The previously mentioned free space or chamber 30 has its bottom wall formed by the top surface of the plate 14, in which the ports 22' to 28' are located. The top wall of this same space or chamber 30 is formed by the bottom surface of the upper plate 18. This plate 18 contains on its periphery connections 32 and 34, see in FIGS. 1, 2, and 3. From the connection 32 (FIGS. 2 and 3) a conduit leads to the conventional source of hydraulic fluid under pressure, such as an oil pump. From the other connection 34 (FIGS. 1 and 2) a conduit leads to the other side or return side of the hydraulic pressure system, such as the conventional oil supply tank. The connection 32 communicates with a port 32' opening at the lower face of the plate 18, and the connection 34 communicates with a port 34' also in the lower face of the plate 18.

In the space or chamber 30 between the plates 14 and 18, there is a control slide indicated in general at 36. As seen in plan in FIG. 4, the control slide 36 extends over only a portion of the area of the chamber 30, covering about half of the area, but being spaced inwardly from the edges of the chamber, such edges being formed, of course, by the inner edge of the annular plate 16. It has a thickness equal substantially to the thickness (top to bottom) of the chamber 30, so that the top and bottom surfaces of the control slide 36 make smooth sliding engagement with the top and bottom surfaces of the chamber as defined by the plates 18 and 14.

For each of the ports or openings 22′ to 28′, the control slide has two control edges developed as the edges of arcuate slots or grooves concentric with the axial center of the valve housing. As seen in FIG. 4, the control edges p′ and p″ form the inner and outer edges, respectively, of an arcuate slot P, which receives oil under pressure through the port 32′ (since this slot P is in communication at all times with the port 32′) and which discharges oil into one or another of the ports 22′, 24′, 26′, and 28′, depending upon the exact position of the control slide 36 which, as will be further apparent below, is mounted for limited sliding movement in any horizontal direction, under the control of the tracer or stylus.

Similarly, there are control edge portions t′ and t″ on the control slide 36, which enable communication (depending upon the exact position of the control slide 36) between the respective ports 22′ to 28′ and the free space within the chamber 30, communicating with the outflow port 34′. The control edge t′ is the outer edge of a groove formed in the lower face of the control slide 36, concentric with the central axis and fairly close to the central axis. The other control edge t″ is the outer peripheral edge of the control slide 36. Whenever the edges t′ and t″ uncover one or another of the ports 22′ to 28′, hydraulic fluid may flow from the uncovered port into the main free space in the chamber 30 and thence out through the port 34′ and connection 34 to the conduit which leads back to the oil tank.

On the upper surface of the control slide 36 there are pockets or grooves 38 and 42 (FIGS. 1, 3, and 4) the areas of which correspond to the areas of the part of the lower face of the slide 36 which is in contact with the hydraulic fluid in the ports 22′ to 28′. These grooves or pockets 38 and 42 are in communication with the lower face of the slide 36 by means of small bore holes 40. Thus the hydraulic fluid pressure acting on the lower face of the control slide 36, at the various ports 22′ to 28′, is equalized with the hydraulic pressure acting on the upper face of the control slide, in the grooves or pockets 38 and 42, thereby tending to equalize the upward thrust on the bottom surface of the slide 36 with a corresponding downward thrust on the top surface of the control slide, to facilitate easy sliding motion of the control slide without excessive binding. No such equalizing bore hole 40 is needed to communicate with the innermost pocket or groove 42, because the ends of this groove open into the main chamber 30. Two stop pins 43 mounted in and projecting upwardly from the top surface of the plate 14 serve to limit possible rotation of the control slide 36, while leaving it sufficient play for necessary displacement during the control operation.

The control slide 36 has a central bore which receives a spherical part 44 at the upper end of the feeler bar structure 46. This bar structure has a vertical stem portion at the central axis of the valve structure (carrying the spherical part 44 at its upper end) and at an intermediate elevation this stem portion has a large circular flange as shown in FIG. 1, constituting a guide plate 48 which lies in the previously mentioned recess 20 in the upper face of the lower housing plate 12. The marginal edges of the guide plate 48 are guided in ball bearings 50 so that the plate may move to a limited extent in all directions horizontally. This arrangement serves for what may be called the parallel guiding of the vertical stem 46. In otherwords, all positions of the vertical axis passing through the stem 46 are parallel to all other positions thereof; it cannot tilt or wobble but it can move freely, within limits, in all horizontal directions. The usual conventional tracer member or feeler member, often called a stylus, is mounted in any conventional manner on the lower end of the stem 46, and in use the tracer or stylus is moved over the surface of the pattern to be copied, the horizontal movements thereof in any direction serving to cause corresponding horizontal movements of the guide plate 48, which in turn causes corresponding horizontal movements of the valve control slide 36, covering and uncovering one or another of the ports 22′ to 28′, to supply hydraulic fluid under pressure to the hydraulic cylinders or other hydraulic motor parts which control the movements of the milling spindle. The use of a hydraulic control valve connected with a tracer or stylus is well understood in the art.

A folded flexible diaphragm 52 (FIG. 1) seals the stem 46 to the bottom plate 12 of the valve housing, as shown. The bottom plate 12 of the housing is provided with a lateral outlet 54 (FIGS. 3 and 4) communicating with the recess 20 in which the guide plate 48 is mounted, so that hydraulic fluid leaking into the space 20 may be discharged through the outlet 54. Also, there are two annular grooves 56 in the plate 16 which are connected by bore holes 58 (FIG. 3) with the space 20, for discharge of leakage oil.

There is a conical bore in the top of the stem 46, as seen in FIG. 1. In this conical bore there is a ball 60, and the top of the ball is seated in a conical recess at the lower end of a threaded bolt 62. If the bolt 62 is screwed down tightly, to press the ball 60 firmly into the recess in the stem 46, this holds the stem 46 against any lateral movement. If the bolt 62 is backed off slightly, the ball 60 will have some freedom of movement and thus the stem 46 will be able to move horizontally. Thus the degree to which the bolt 62 is tightened or loosened serves as a control for limiting the extent of horizontal displacement of the stem 46 and, with it, the horizontal displacement of the control slide 36.

The screw threads of the bolt 62 screw into a bushing member 72 as further mentioned below. The head of the bolt 62, which is located above the top of the bushing member, is developed in the form of a protruding edge or marginal flange 64 which can be clamped fast to a plate 66 by tightening screws 68 mounted in the plate 66 and drawing upwardly on an annular ring which engages the bottom surface of the projecting flange 64. Thus, by tightening the screws 68, the bolt 62 can be coupled to the plate 66 so that the two parts 62 and 66 turn together as a unit.

The plate 66 is knurled at its periphery, as seen in FIG. 3 and it bears a numerical scale as shown, which is read in conjunction with a fixed reference point 70. By turning the plate, after it has been clamped in the desired calibrated position with respect to the bolt 62, the bolt is thereby turned to adjust the freedom of movement of the ball 60 and thus adjust the maximum displacement of the feeler stem 46 in any direction from its central position, and the stem can be locked in the central or zero position by turning the plate 66 in a direction to screw the bolt down tightly against the ball 60. The threads of the bolt 62 engage with internal threads in a bushing 72 which, after loosening of holding screws 74, can be adjusted and locked by four set screws 76 (FIGS. 1 and 2) threaded in radial bores in the upper housing plate 18.

A channel 78 (FIG. 1) in the upper part of the feeler stem 46 serves to discharge leakage oil into the recess 20, from which it flows out through the leakage discharge port 54.

In operation, if the control slide 36 moves rightwardly (when viewed as in FIG. 4) from its central or zero position, the edge p″ of the groove P (this groove being constantly supplied with hydraulic fluid under pressure) will overlap the edge of the port 22′, and close communication with the port 24′, but at the same time the edge $t'$ will open communication with the port 24'. Thus hydraulic fluid under pressure will be supplied to the port 22' and thereby to the conduit connected to the connection 22, while hydraulic fluid from the connection 24 leading to the opposite end of the same hydraulic cylinder can flow through the port 24' past the edge $t'$ and thereby into the main space 30 and out through the discharge port 34' and the discharge conduit connected to the connection 34. When the control slide 36 moves leftwardly from its central or zero position, a reverse action occurs. The edge $p''$ of the groove P covers the port 22' and the edge $p'$ thereof uncovers the port 24', while the edge $t''$ uncovers the port 22' to permit discharge from this port into the main space 30. Similar actions occur with respect to the ports 26' and 28' when the control slide 36 moves in a direction at right angles to the movements just described; that is, in a direction upwardly or downwardly with respect to FIG. 4. One of the features of the present invention, however, is that the respective ports and the respective control edges $p'$, $p''$, $t'$, and $t''$ are so related to the size of the ports 22' to 28' that when the control slide 36 is in its central or zero position, there is a slight communication with all of the ports, thereby allowing a continuous flow of a slight amount of hydraulic fluid in order to keep the ports and particularly the edges thereof flushed out, avoiding build-up of deposits or encrustation.

The positioning of the control edges so that the ports are constantly slightly open when the control slide is in its central or zero position, is referred to as negative overlap. It applies both to the control edges $p'$ and $p''$ which control pressure flow into the ports, and also to the control edges $t'$ and $t''$ which control outflow or relief from the ports. In addition to the previously mentioned advantage of keeping the ports flushed out and avoiding build-up of deposits, the negative overlap has the further advantage of producing an immediate response of control, even upon the slightest displacement from zero position.

The extent of negative overlap with respect to the control edges $p'$ and $p''$ which control inflow, may be different from the extent of negative overlap with respect to the edges $t'$ and $t''$ which control outflow or return flow. If it is desired to maintain the hydraulic fluid pressure in the motor at approximately zero when the valve is in the central or zero position, then the parts are proportioned so that the negative overlap of the inflow control edges $p'$ and $p''$ is somewhat less than the negative overlap of the outflow control edges $t'$ and $t''$. Consequently, in the central or zero position of the valve, some of the hydraulic fluid under pressure will be constantly flowing into all of the ports 22' to 28', but the available outflow area from these same ports, past the outflow control edges $t'$ and $t''$, will be slightly larger, so that no substantial pressure will be maintained in the various conduits leading from the control valve to the hydraulic motors. On the other hand, it may be desired (especially when the hydraulic motor to be controlled is in the form of a hydraulic cylinder and piston) to keep the full maximum pump pressure in the conduits leading from the valve to the motors, when the valve is in the central or zero position. This is accomplished by making the negative overlap of the outflow control edges $t'$ and $t''$ slightly less than the negative overlap of the inflow control edges $p'$ and $p''$, so that the outflow from the ports is more restricted than the inflow, thereby maintaining pressure in the conduits.

Among the advantages of the present construction is the fact that the compact arrangement of the ports close to each other reduces errors resulting from thermal expansion. Where ports are widely separated, as in some of the valves of the prior art, thermal expansion caused by heating produced by the machining operation during manufacture, may result in faulty positioning of the ports relative to each other, and when the valve is in use, thermal expansion due to heating of the hydraulic fluid may cause difficulties in operation. Where the ports are very close together, the chance of defects resulting from thermal expansion either during the manufacturing operation or during the use of the valve are correspondingly reduced. The placing of the ports close together has the further advantage that the size of the control slide is reduced, and with reduction of areas of contact between the control slide and the stationary parts of the valve, there is a considerable reduction of the areas through which leakage may occur and a considerable reduction in the areas subjected to oil pressure which presses the control slide against stationary surfaces, thereby reducing the friction and making the valve easier to operate.

Another advantage of the present construction is that by making the control edges in the form of arcs concentric about the central axis of the valve, any slight rotary motion of the control slide has no effect. Consequently it is not necessary to take elaborate precautions to prevent slight turning of the control slide. The two stop pins 43 limit the turning of the control slide to a reasonable amount, without interfering in any way with the range of normal operating movement of the control disk or slide in any direction, and the slight turning movement which is permitted by the stop pins 43 has no effect on the opening and closing of the ports.

The oil pockets 38 and 42 on the upper face of the control slide serve to equalize to a great extent the hydraulic fluid pressure on the top face of the slide with that on the bottom face thereof, with the result that there is practically complete equalization of the pressure on the two faces of the control slide, so that the slide floats freely between the two oil films on its top and bottom faces, practically without friction. The frictionless or low friction travel of the control slide is further promoted by the spherical connection 44 between the control stem and the control slide. The control stem is intended to have its motion in a plane parallel to the plane of movement of the control slide, but in case, through manufacturing errors or through wear, there is any looseness or tilting of the control stem with respect to the control slide, the spherical connection 44 of the stem engaging in a cylindrical bore in the slide allows the slide to move smoothly notwithstanding any possible tilting of the control stem.

It has been mentioned that the tracer or stylus is connected to the lower end of the control stem 46. This need not be a direct connection. The tracer may be operatively connected to the stem 46 in any desired manner, by any known form of linkage or otherwise.

What is claimed is:

1. A hydraulic control valve for copying-milling machines, said valve comprising a body part having a surface on which a control slide may slide, four hydraulic fluid ports in said surface, a control slide having a first face seated on and slidable over said surface of said body part, said face of said slide having control edges cooperating with said ports to open and close said ports, and an operating member movable relative to said body part and operatively connected to said slide to move said slide over said surface to change the relationship between said control edges and said ports, said operating member including a stem having an axis, characterized by the fact that said four ports are arranged in two pairs, the two ports of one pair being arranged alongside of each other in close proximity and on the same side of said axis and with their centers on a line extending radially with respect to said axis in one direction, the two ports of the other pair being arranged alongside of each other in close proximity and on the same side of said axis and with their centers on a line extending radially with respect to said axis in a direction substantially perpendicular to the first mentioned line, and that said control slide encompasses only a minor part of said surface which contains said ports, the two ports of one pair being adapted to control flow of hydraulic fluid to and from one fluid motor operating in one direction, and the two ports of the other pair being adapted to control flow of hydraulic fluid to and from a second fluid motor operating in a direction at right angles to the direction of the first fluid motor.

2. A valve as defined in claim 1, wherein said valve has a body of approximately circular outline, wherein said operating member includes an axial stem located approximately centrally with respect to said circular outline, and wherein normal operating movements of said stem serve to move said control slide in directions substantially radial with respect to the axis of said stem.

3. A valve as defined in claim 1, wherein said operating member includes a stem having an axis extending approximately perpendicular to said surface containing said ports, and in which normal operating movements of said stem include movements in various radial directions with respect to said stem axis, thereby causing movement of said slide in various radial directions with respect to said stem axis.

4. A valve as defined in claim 3, characterized by the fact that said control edges on said slide and the edges of the ports which cooperate therewith are developed as parts of circles concentric with said axis.

5. A valve as defined in claim 4, characterized by the provision of two stops placed to permit limited movement of said slide in a rotary direction with respect to said axis.

6. A valve as defined in claim 1, in which said control edges of said slide include edges controlling inflow into said ports and other edges controlling outflow from said ports, characterized by the fact that all of said control edges of said slide have negative overlap with respect to the edges of said ports, and that the control edges controlling inflow have a different degree of negative overlap than that of the control edges controlling outflow.

7. A valve as defined in claim 6, characterized by the fact that the negative overlap of the control edges controlling inflow is less than the negative overlap of the control edges controlling outflow.

8. A valve as defined in claim 6, characterized by the fact that the negative overlap of the control edges controlling inflow is greater than the negative overlap of the control edges controlling outflow.

9. A valve as defined in claim 1, wherein said operating member is guided to move in directions substantially parallel to the directions of sliding movement of said control slide, characterized by the fact that the operative connection between said operating member and said control slide is through a spherical surface which permits deviations from the intended parallelism of the motions of the parts without causing tilting and binding of said control slide.

10. A valve as defined in claim 9, characterized by the fact that the operative connection between said operating member and said control slide is formed by a spherical surface on said control member engaging snugly in a cylindrical axial bore in said control slide.

11. A valve as defined in claim 1, characterized by adjustable means limiting the range of displacement of said operating member and control slide from an initial central position, said limiting means comprising a conical recess in said operating member, a ball having one portion seated in said recess, and an axially adjustable bolt having a conical recess for receiving another portion of said ball, the parts being so arranged that adjustment of said bolt axially toward and away from said recess in said operating member serves to vary the extent to which said operating member and ball can move in directions radially with respect to the axis of said bolt.

12. A valve as defined in claim 11, characterized by the fact that said bolt is adjustably supported in a bushing which is adjustable with respect to a fixed body part of said valve.

13. A valve as defined in claim 12, characterized by the fact that said valve has a body which is externally of generally circular cylindrical form, and that the axis of said bolt is substantially alined with the central axis of the circular cylindrical part of said body, and further characterized by a rotary adjusting member externally accessible on said body and mounted for rotation about said central axis, said bolt being screw threaded into said bushing and being connected to said rotary adjusting member to turn therewith, and graduated scale means for setting said rotary adjusting member and said bolt in any selected one of a series of positions to cause said bolt to limit the displacement of said operating member to a predetermined range.

References Cited

UNITED STATES PATENTS

| | | | |
|---|---|---|---|
| 2,836,387 | 5/1958 | Rosebrook | 251—3 |
| 2,911,182 | 11/1959 | Clarke et al. | 251—3 |
| 3,148,594 | 9/1964 | McCoy | 251—3 XR |
| 3,174,403 | 3/1965 | McCoy | 251—3 XR |
| 3,331,395 | 7/1967 | Laws | 137—625.2 |

WILLIAM F. O'DEA, Primary Examiner

R. GERARD, Assistant Examiner

U.S. Cl. X.R.

137—625.2